INVENTOR
JOHN COMPERATORE

BY

ATTORNEYS

United States Patent Office 3,403,991
Patented Oct. 1, 1968

3,403,991
METHOD AND APPARATUS FOR BENDING
GLASS SHEETS
John Comperatore, Natrona Heights, Pa., assignor to PPG
Industries, Inc., a corporation of Pennsylvania
Filed Mar. 22, 1965, Ser. No. 441,421
7 Claims. (Cl. 65—107)

ABSTRACT OF THE DISCLOSURE

Method and mold for bending glass sheets supported at their end portions for downward bending on counterweighted support members whose downward motion from a flat glass supporting position to a molding position is regulated by pivoting the support members downward on opposite sides of the counterweights and constructing and arranging the counterweights relative to the support members so that the counterweights are sufficiently large to rotate the support members upward in the absence of a load of glass thereon, but sufficiently small to permit the support members to rotate downward in response to the combined mass of the support members and a load of heat-softened glass on the mold.

---

This invention relates to bending glass sheets, and specifically relates to apparatus for bending a plurality of glass sheets simultaneously.

Bulletproof glass comprises many layers of tempered glass laminated together to form a composite of glass and plastic which inhibits the penetration of bullets or ballistic missiles therethrough. Unless all the glass sheets, ranging in number of up to six or eight, are bent simultaneously into intimate contact, it becomes very difficult to laminate the bent sheets together.

The present invention provides means for insuring that a stack of glass sheets heated together simultaneously is supported until the sheets reach deformation temperature, and then permitted to sag slowly with a force applied to support the ends of the glass sheets while they are sagging so that they do not sag freely. This end support permits all the glass sheets of the stack to be bent simultaneously in intimate contact.

Figure 2:
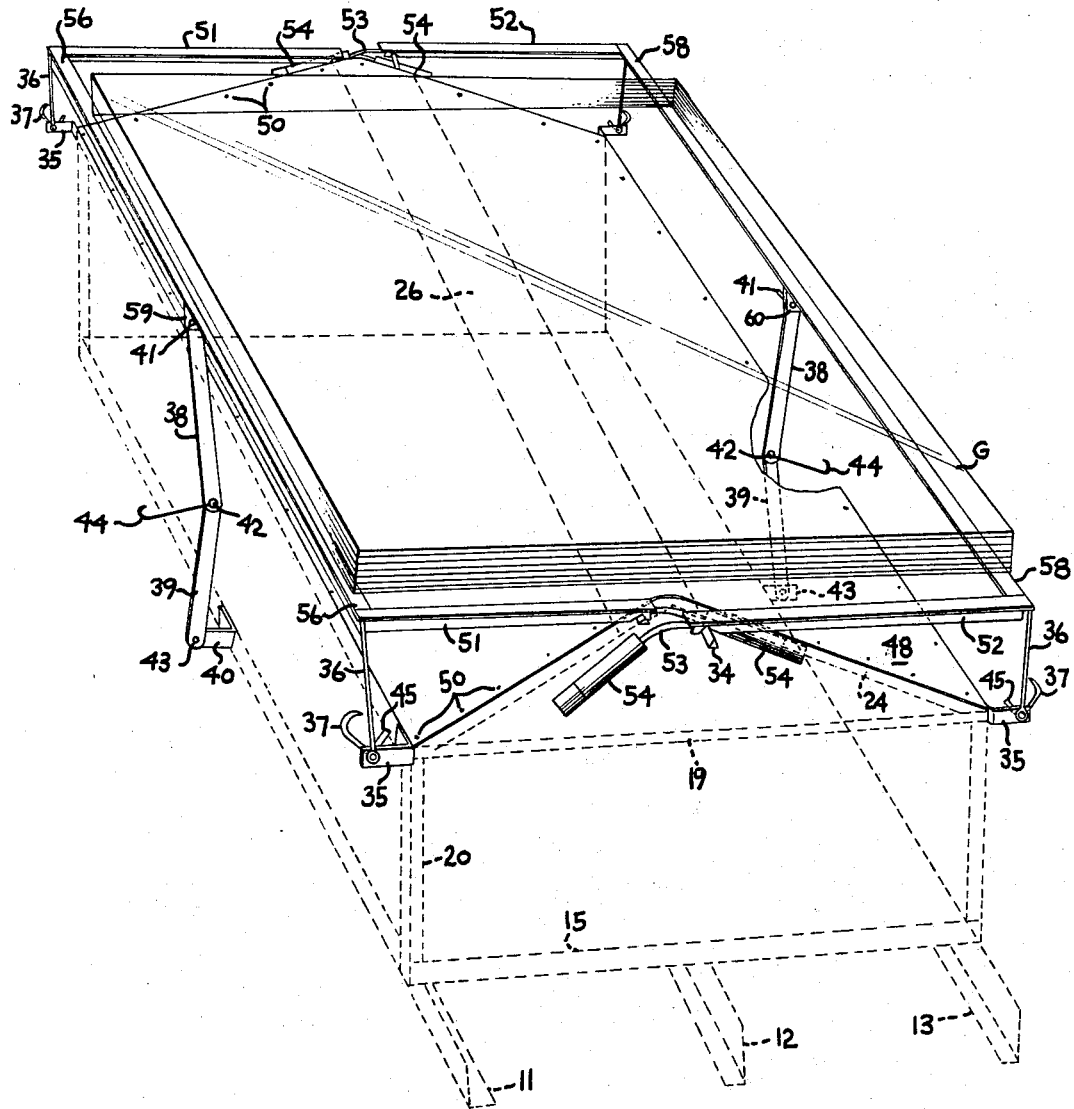
Figure 3:
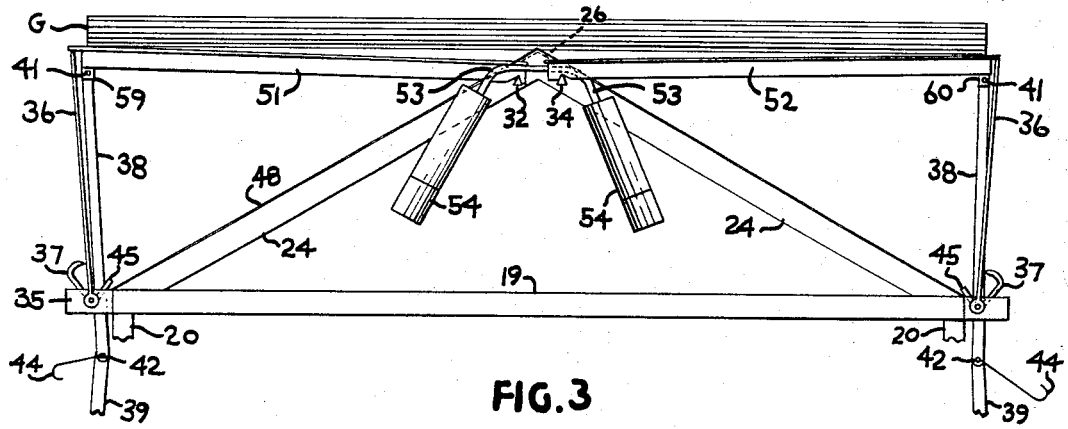
Figure 4:
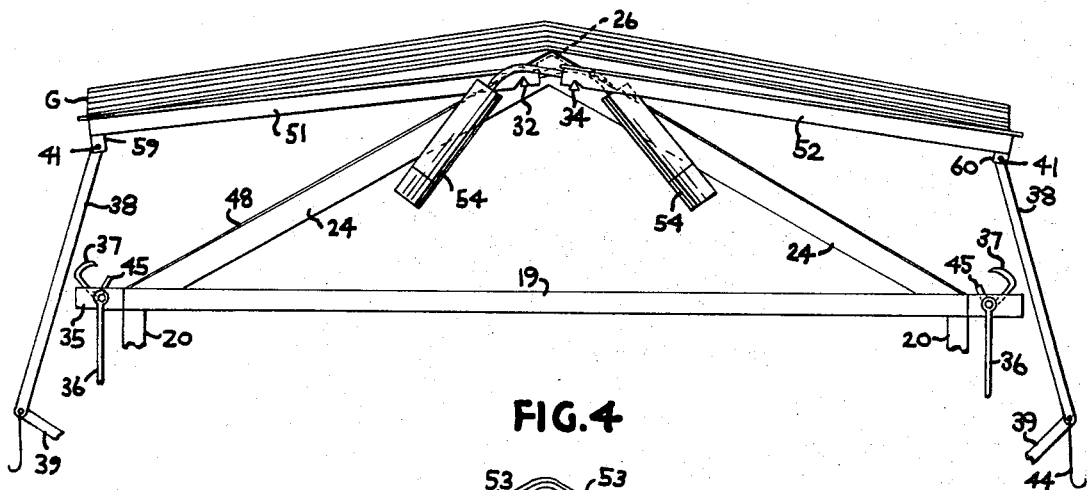
Figure 5:
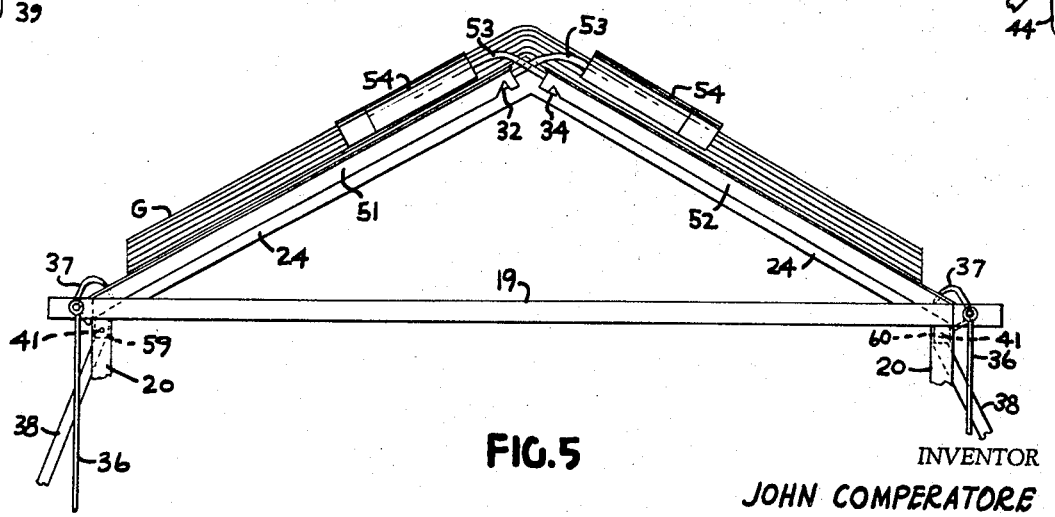

The invention will be understood better in the light of the description of an illustrative embodiment which follows. In the drawings which form part of the description of the illustrative embodiment and wherein like reference numbers refer to like structural elements, FIG. 1 is a perspective view of a skeleton support for the bending mold according to the present invention;

FIG. 2 is a perspective view of the bending mold according to the present invention mounted on said support structure and showing a plurality of glass sheets being supported preparatory to bending;

FIGS. 3, 4, and 5 are schematic cross-sectional views of the mold of FIG. 2, showing the critical elements of the mold as the flat glass sheet is mounted, as the glass is partially bent, and as the glass is completely bent, respectively.

Figure 1:
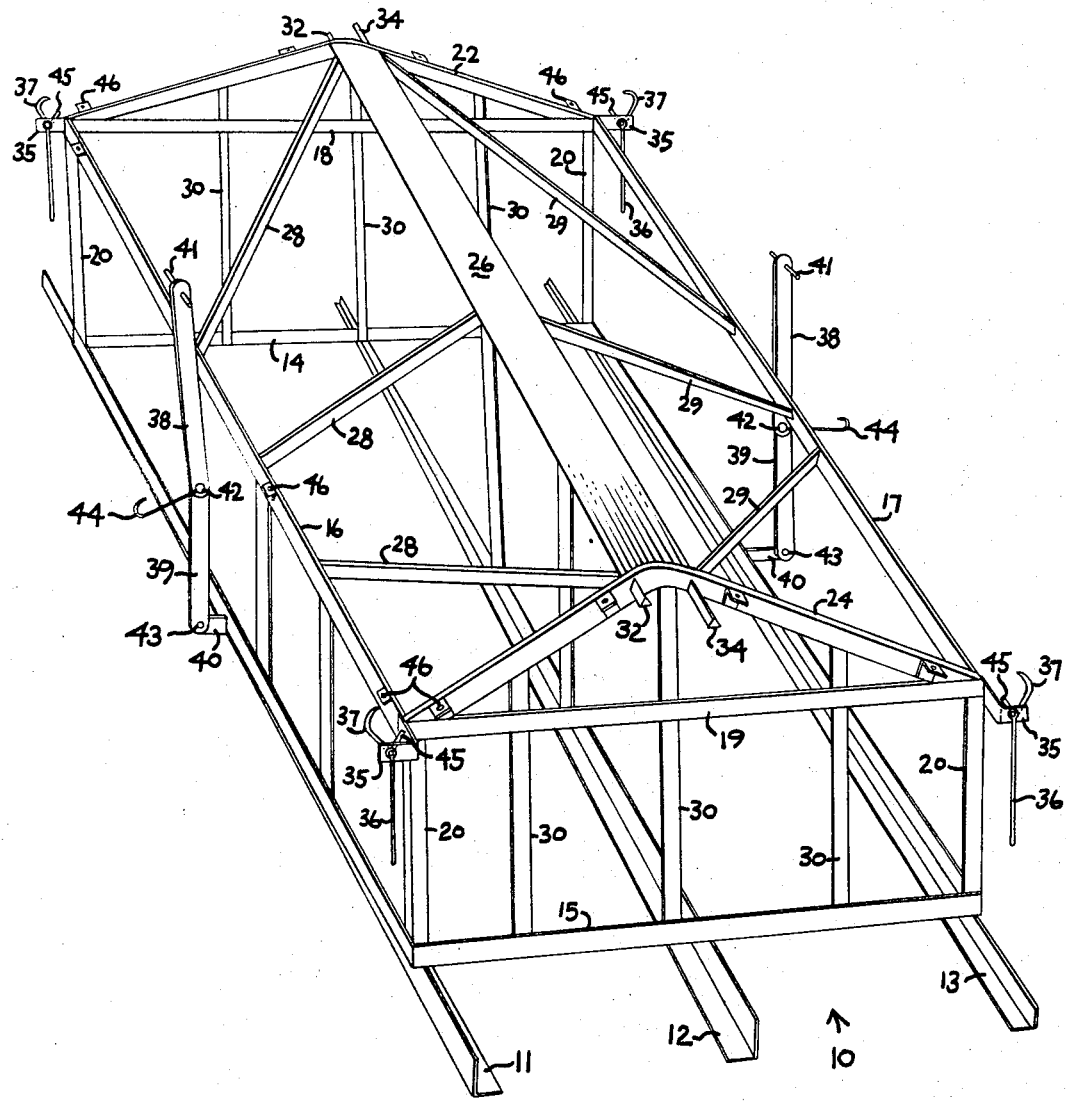

Referring to the drawings, FIG. 1 shows a skeleton support generally indicated at 10 comprising three longitudinally extending angles 11, 12, and 13, interconnected near their ends by a pair of lower transverse angles 14 and 15 to form a lower frame. An upper frame comprises upper longitudinal beams 16 and 17 interconnected at their ends by upper transverse beams 18 and 19. The corners of the upper and lower frames are interconnected by a plurality of corner posts 20. If desired, additional posts may be provided for further rigidity. Curved end beams 22 and 24 interconnect upper longitudinal beams 16 and 17 in a curved path conforming substantially to the curvature desired for the shaping surface of the mold.

An elongated member 26 having a curved upper surface conforming to a locally sharply bent portion of the shaping surface extends between the uppermost intermediate portions of the curved end beams 22 and 24.

Additional bracing members 28 interconnect upper longitudinal beam 16 with elongated member 26, while additional bracing members 29 interconnect upper longitudinal beam 17 with the elongated member 26. Additional vertical posts 30 support the curved end beams 22 and 24 in spaced relation above the lower transverse angles 14 and 15.

A short knife-edge member 32 and a relatively long knife-edge member 34 extends from the outward facing surface of each of the curved end beams 22. The knife-edge members 32 are in alignment with one another and the knife-edge members 34 are in alignment with one another to provide two axes of pivoting.

A bracket 35 extends outward from each end of each of the angles 16 and 17. An elongated rod 36 is pivotally mounted to each bracket. A hook member 37 is attached to each bracket 35. A lug 45 is rigidly secured to each hook member 37.

In addition, the skeleton support comprises a pair of links 38, 39, at each end. Links 38 are pivotally attached to a mold member by pins 41. Pins 42 interconnect links 38 and 39. Lower links 39 are pivotally supported on centrally located brackets 40 rigidly attached to the longitudinal angles 13 by pins 43. A hook 44 is supported at the hinge connection between links 38 and 39 formed by each pin 42.

A plurality of apertured tabs 46 are connected to each of the curved end beams 22 and 24 and each of the upper longitudinal beams 16 and 17 and extend outward of said beams.

As illustrated in FIG. 2, a thin metal sheet 48 such as stainless steel is positioned over the upper longitudinal beams 16 and 17 and the curved end beams 22 and 24 to form a curved shaping surface of continuous extent. The upper surface of the elongated member 26 is shaped to the desired localized shape wanted for the central portion of the plurality of glass sheets to be shaped whereas the portions outward of the sharply bent region are relatively flat.

The sheet 48 shown in FIG. 2 is secured to the upper surface of the upper longitudinal beams 16 and 17 and the curved end beams 22 and 24 by a plurality of bolts 50. The sheet is slightly larger than the upper surface of the framework formed by the upper longitudinal beams 16 and 17 and the curved end beams 24, and preferably extends about 1½ inches beyond the peripheral members all around the framework.

The bolts 50 are preferably ³⁄₁₆ inch diameter flat edge stove bolts which pass through chamfered holes in the stainless steel sheet and through the apertured tabs which are aligned with the chamfered holes provided in the sheet 48. The apertures in the tabs 46 are preferably ¼ inch in diameter to provide for expansion of the sheet during heating.

Referring to FIG. 2, a pair of lever arms 51 are pivotally mounted with respect to the short knife-edge members 32 and a pair of lever arms 52 are pivotally supported by the relatively long knife-edge members 34. A curved rod 53 is secured to the inner end of each of the lever arms 51 and 52. A weight 54 is secured to the inner end of each of the curved rods 53.

A glass end support member 56 interconnects the outer ends of lever ams 51. Another glass end support member 58 interconnects the outer ends of lever arms 52 to support the other end of a stack of glass sheets. Glass end support member 56 has a pair of apertured brackets 59 extending downward for engagement by pins 41, whereas glass end support member 58 has a pair of apertured brackets 60 extending downward of its central portion for the same purpose.

The weights 54 are of sufficient mass to rotate their attached glass support members 56 and 58 upward when the latter is not loaded. However, they are not so heavy that they prevent downward rotation of the attached pivoted member when a load of glass sheets mounted thereon is softened to be free to sag downward. Thus, the weight means 54 urge the members 56 and 58 to bear upward into supporting engagement against the opposite ends of a stack of glass sheets mounted on the mold for bending while the glass sheets are being heated. When the glass sheets are heated to a temperature at which they deform and sag downward, the weight means reduces the rate that the opposite ends of the glass sheet sag downward when the glass reaches deformation temperature.

In a typical bending operation, a stack of glass sheets is mounted in superimposed relation above a "burn" plate. The latter is a sheet that maintains the glass sheets to be bent in spaced relation to the shaping surface.

The central portions of the glass sheets are supported immediately above the portion of the sheet 48 immediately above the elongated member 26 with the ends of the sheet supported on the glass support members 56 and 58. The latter are urged upward by the moments of force applied by weights 54 about the respective pivot axes provided by knife-edge members 32 and 34. The elongated rods 36 are rotated into an almost vertical position when sufficient sheets of rigid glass rest on the mold to insure that the mold remains in flat glass support position. The links 38 and 39 are rotated into position with pins 42 slightly inward of vertical lines that can be drawn between pins 41 and 43 to support the central portion of the glass end support members 56 and 58. The loading of the mold is continued until a sufficient number of glass sheets are mounted thereon to provide a bulletproof assembly having the number of laminations desired for the ultimate product to be made.

The glass-laden mold with the glass end support members 56 and 58 rigidly supported in a horizontal position on the almost vertically disposed rods 36 and with the stack of glass sheets resting thereon is introduced into a furnace. There the glass is heated generally to a temperature sufficient for bending. Additional intense heaters are positioned immediately above and below the portion of the glass sheet disposed over the elongated member 26 to heat the longitudinally extending area to be sharply bent more severely than the remainder of the sheet. The temperature of the furnace and the glass is increased until the general glass temperature reaches 1150 degrees Fahrenheit.

At this time, hooks 44 are engaged by hook tripping mechanisms within the furnace to pull the joints formed by pins 42 outward. This causes links 38 and 39 to rotate from their original angular inward position to a slightly angular outward position.

As the links 38 and 39 rotate from their angular inward to their angular outward position, they pass through a position wherein they are aligned linearly. At this point in their movement they lift the glass end support members 56 and 58 sufficiently to permit clearance for the rods 36 to rotate outward from positions in support of members 56 and 58. Thus, the rigid supporting elements 36 for the glass end support members 56 and 58 are removed from supporting contact.

The weight of the heat-softened glass causes the counterweighted members 56 and 58 to rotate downward relative to the axes of pivoting provided by the knife-edge members 32 and 34 at a slow rate. Members 56 and 58 are spaced from one another a distance slightly greater than the extent of plate 48. This permits the softened glass sheets to rest upon and assume the curvature of the shaping surface provided by the thin metal sheet 48.

As the proportion of the mass of the glass resting on sheet 48 increases, the tendency of the weights 54 to lift the glass end support members 56 and 58 increases. To prevent the weights 54 from lifting the glass from its desired shape, members 56 and 58 engage the lugs 45 rigidly secured to hook members 37 as the glass end support members 56 and 58 approach their closed position. The lugs 45 are forced to rotate inward so that hooks 37 lock the glass end support members 56 and 58 in their desired molding positions.

A sheet of polished plate glass ¼ inch thick was used as the "burn" plate. This "burn" plate was first positioned on the mold followed by two ⅛ inch thick polished glass sheets and then five ¼ inch thick polished water white glass sheets positioned on top of the thinner sheets. The "burn" plate was the only glass sheet to come into contact with the metal sheet 48.

A dispersion of mica in water was used as a parting material between adjacent sheets to prevent the sheets from fusing together during the bending and annealing cycle.

After bending the sheets to conform to the shaping surface and into intimate contact with one another, the sheets were annealed by controlled gradual cooling. The "burn" plate was removed and the remaining glass sheets were assembled with polyvinyl butyral interlayers to form a thick sandwich. The sandwich was inserted into a plastic bag or envelope. The bag was evacuated and sealed and inserted within an oil autoclave containing the assembled sandwich. The resulting structure was used as a bulletproof roof for the Presidential vehicle.

The form of the invention shown and described in this disclosure represents an illustrative embodiment thereof. It is understood that various changes may be made without departing from the spirit of the invention as defined in the claimed subject matter which follows.

What is claimed is:

1. Apparatus for bending a plurality of glass sheets simultaneously to a shape having a locally sharply bent central portion comprising a skeleton support, an elongated member having a curved upper edge conforming to the locally sharply bent portion of the final bend extending intermediate the ends of said support for supporting an elongated portion of a plurality of glass sheets to be bent simultaneously, a glass end support member extending substantially parallel to said elongated member on each side thereof, a pivoted member pivotally mounting each said glass end support member on said support for movement between an upper flat glass loading position to support the opposite ends of a plurality of glass sheets for bending and a lowered position, weight means mounted on each said pivoted member in position to oppose downward movement of said glass end support member and of sufficient mass to rotate its attached pivoted member upward when the latter is not loaded but of insufficient mass to prevent downward rotation of the latter when said glass end support member is loaded with a stack of heat-softened glass sheets, a shaped sheet mounted on said skeleton support and said elongated member and conforming to the bent shape desired for the glass sheets and having a transverse dimension slightly less than the distance between said glass end support members, and heating means to heat said plurality of glass sheets to deformation temperature while supported on said elongated member and said glass end support members, whereby said weight means urge said glass end support members to bear upward into supporting engagement against the opposite ends of said stack of glass sheets while heating and reduce the rate that said opposite ends sag downward when the glass reaches deformation temperature.

2. Apparatus as in claim 1, further including releasable locking means mounted to said support to lock said glass end support member in said said upper flat glass loading position.

3. Apparatus as in claim 1, further including hook means disposed in the path of downward movement of each glass end support member for engagement therewith as the latter approaches said lowered position to lock the latter in said lowered position.

4. Apparatus for bending softened glass sheets comprising:
  a first support,
  an elongated supporting member mounted on said first support for supporting at least one glass sheet along a line intermediate spaced opposing edges of the sheet,
  spaced pairs of pivotal supporting means piovtally mounted on said first support, each comprising a pair of members rotatable about an axis adjacent said elongated supporting member,
  elongated glass edge supporting members each extending between and being secured adjacent the ends thereof to corresponding opposed members of said pairs of pivotal supporting means,
  means for stopping said glass edge supporting members when each reaches a lower glass supporting position, and
  means for applying a force to said glass edge supporting member for counteracting its movement during the descent thereof, said last named means being of sufficient mass to rotate said glass edge supporting member upward when the latter is not loaded but of insufficient mass to prevent downward rotation of the latter when said glass end support member is loaded with a stack of heat-softened glass sheets.

5. Apparatus as in claim 4, further including releasable locking means mounted to said support to lock said glass end support member in said upper flat glass loading position.

6. Apparatus as in claim 4, further including hook means disposed in the path of downward movement of each glass end support member for engagement therewith as the latter approaches said lower position to lock the latter in said lower position.

7. A method of bending moldable glass sheets comprising:
  stacking a plurality of glass sheets,
  horizontally supporting opposite edges of said stack,
  applying a supporting force to the lower surface of said stack throughout a zone intermediate of said opposing supported edges,
  heating said stack until said sheets are softened,
  withdrawing the opposing edge supporting force from each edge of said stack,
  immediately thereafter applying a force along the lower surface of each of said opposing edges, said last named force being of a magnitude less than that exerted by the overlying heat-softened glass sheets, but sufficient to counteract enough of the force exerted by the weight of said overlying heat-softened sheets until a predetermined bend is reached, and
  immediately applying sufficient force to each of said opposing edges of said stack to stop the bending of said heat-softened sheets.

References Cited

UNITED STATES PATENTS

| | | | |
|---|---|---|---|
| 2,218,654 | 10/1940 | Paddock | 65—107 |
| 2,993,303 | 7/1961 | Devore | 65—289 X |
| 3,248,201 | 4/1966 | Black et al. | 65—107 |
| 3,253,899 | 5/1966 | McMaster | 65—289 |

DONALL H. SYLVESTER, *Primary Examiner.*

ARTHUR D. KELLOGG, *Assistant Examiner.*